United States Patent [19]

Arents

[11] Patent Number: 4,568,972
[45] Date of Patent: Feb. 4, 1986

[54] INSTRUMENT MONITORING ASSEMBLY

[75] Inventor: Donald N. Arents, Newport News, Va.

[73] Assignee: The United States of America as represented by the Secretary of the Army, Washington, D.C.

[21] Appl. No.: 552,940

[22] Filed: Nov. 17, 1983

[51] Int. Cl.⁴ .............................................. H04N 7/18
[52] U.S. Cl. .................... 358/108; 358/226; 358/901
[58] Field of Search ............... 358/108, 901, 225, 226

[56] References Cited

U.S. PATENT DOCUMENTS

| 2,578,939 | 12/1951 | Moran | 358/108 |
| 3,294,903 | 12/1966 | Goldmark | 358/901 |
| 4,152,724 | 5/1979 | Hunter | 358/901 |

Primary Examiner—Howard W. Britton
Attorney, Agent, or Firm—Norman L. Wilson, Jr.; Anthony T. Lane; Robert P. Gibson

[57] ABSTRACT

The testing of aircrafts is very expensive and time-consuming. Many test programs require detailed records of aircraft parameters which are only available from the cockpit instruments. In some instances it is necessary for the copilot to record manually these parameters during the test. When the testing requires both the pilot's and copilot's attention, problems arise, calling for duplicate instruments or the placement behind the pilot of a movie camera which views the instruments. Such problems are overcome by the instrument viewing assembly provided herein adapted for use where a plurality of instruments must be remotely monitored but where instruments are so separated that they cannot be viewed by a single viewing camera.

5 Claims, 4 Drawing Figures

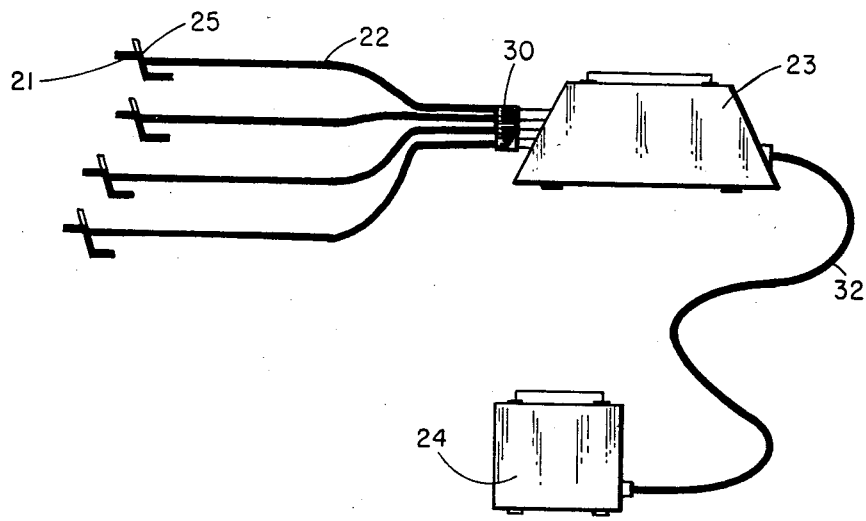
FIG. 1
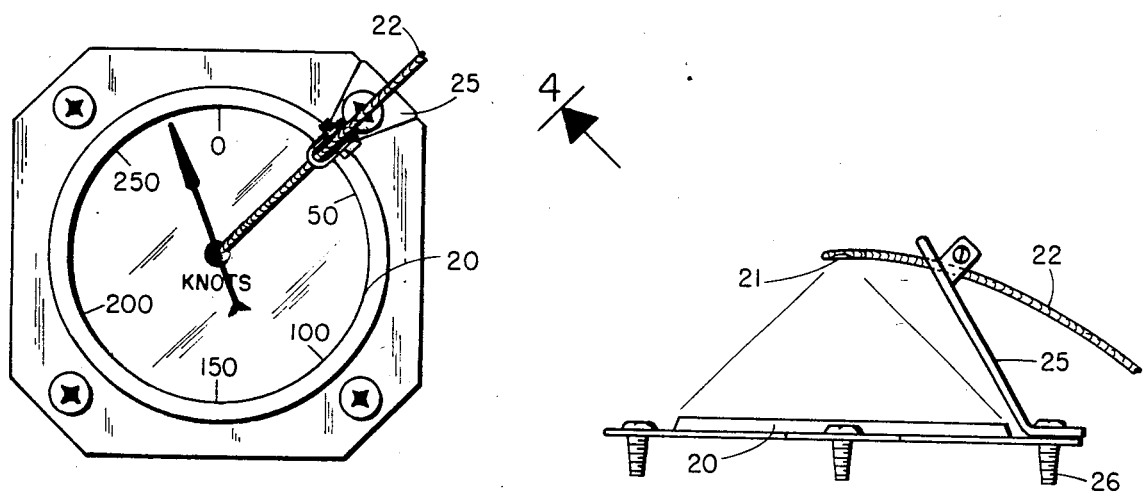
FIG. 3
FIG. 4

INSTRUMENT MONITORING ASSEMBLY

BACKGROUND OF THE INVENTION

This invention pertains to the monitoring of a variety of instruments, wherein the number of instruments, or their location, renders their monitoring by a single individual or single television camera an impossibility.

As an example of such a multiple instrument monitoring problem, envision the testing of aircrafts. Such testing is very expensive and time-consuming. Many test programs require detailed records of aircraft parameters, for instance airspeed and outside air temperature, which are only available from the cockpit instruments. In such instances it becomes necessary for the copilot to record manually these parameters during the test. When the testing requires both the pilot's and copilot's attention, one frequently employed alternative is to provide duplicate instruments at some other location in the aircraft as a secondary or photopanel installation. This is an expensive alternative. Another alternative involves the placement behind the pilot of a movie camera which views the instruments. This method is not totally satifactory because the camera does not always provide clear, precisely deflned pictures of the cockpit instrumentation due to lighting and vibration effects. Poor lighting, and differing instrument panel and movie camera vibration frequency levels are difficult obstacles to overcome.

As another example of the multiple instrument monitoring problem consider intensive care units in hospitals and nursing homes. Monitoring of patient's vital signs is generally accomplished by television cameras conveying instrument readings to monitors at distant nursing stations. At times, however, all of the instruments used cannot be placed in view of a single TV camera. Personnel must then make periodic visits to the room in spite of the use of a video camera. This, the aircraft testing, and similar problems are overcome by the practice of this invention.

SUMMARY OF THE INVENTION

An instrument viewing assembly is provided herein for use where a plurality of instruments must be remotely monitored but where instruments are so separated that they cannot be viewed by a single viewing camera. The assembly herein includes an objective lens for use with each instrument, and means mounting the lens above each instrument face so that the lens is focused thereon. A coherent fiber optic light guide termed image guide, is coupled to each lens. These image guides merge to form an integral fiber optic bundle for transmitting the images to a remote location. A viewing camera at the remote location is coupled by a camera adapter to the fiber optic bundle so that the instrument faces can be seen.

DETAILED DESCRIPTION OF THE INVENTION

In its preferred embodiment the instrument viewing assembly of this invention is a closed circuit television system with miniature fiber optic image guides branching off to the necessary instruments. These fiber optic image guide branches have ends adapted to be focused on the instruments. As a result various instruments are transmitted to a closed circuit television camera. The camera, in turn, magnifies and transmits the images to a video recorder which displays all instrument faces simultaneously.

Image guides can be attached to the side of each instrument by removing a mounting screw and using it, after adding a bracket, to hold the image guide, which preferably will be a flexible armored stainless steel encased coherent light guide. Generally the image guide tip will be provided with a miniature objective lens focusable on the instrument face. Economically the objective lens can be a fixed focus lens with the bracket set to hold it the proper distance from the instrument such that the face is in focus. The fiber optic cable, then, will will be installed between this focused lens and a television or other camera. The fiber optic image guide can be coupled to the camera using a relay lens and a standard C-mount adapter.

Having described the invention in detail, we will now, in conjunction with the accompanying drawings, consider a preferred embodiment of the instrument viewing assembly of the invention. In its preferred form the invention provides a system which renders multiple images readily viewable for test flight purposes. In the drawings:

FIG. 1 is a diagrammatic presentation of the invention.

FIG. 3 is a top view of the lens, showing the image guide, and the bracket attaching it to the instrument face.

FIG. 4 is a detailed side view showing the attachment of a bracket to the instrument face.

Figure 2:
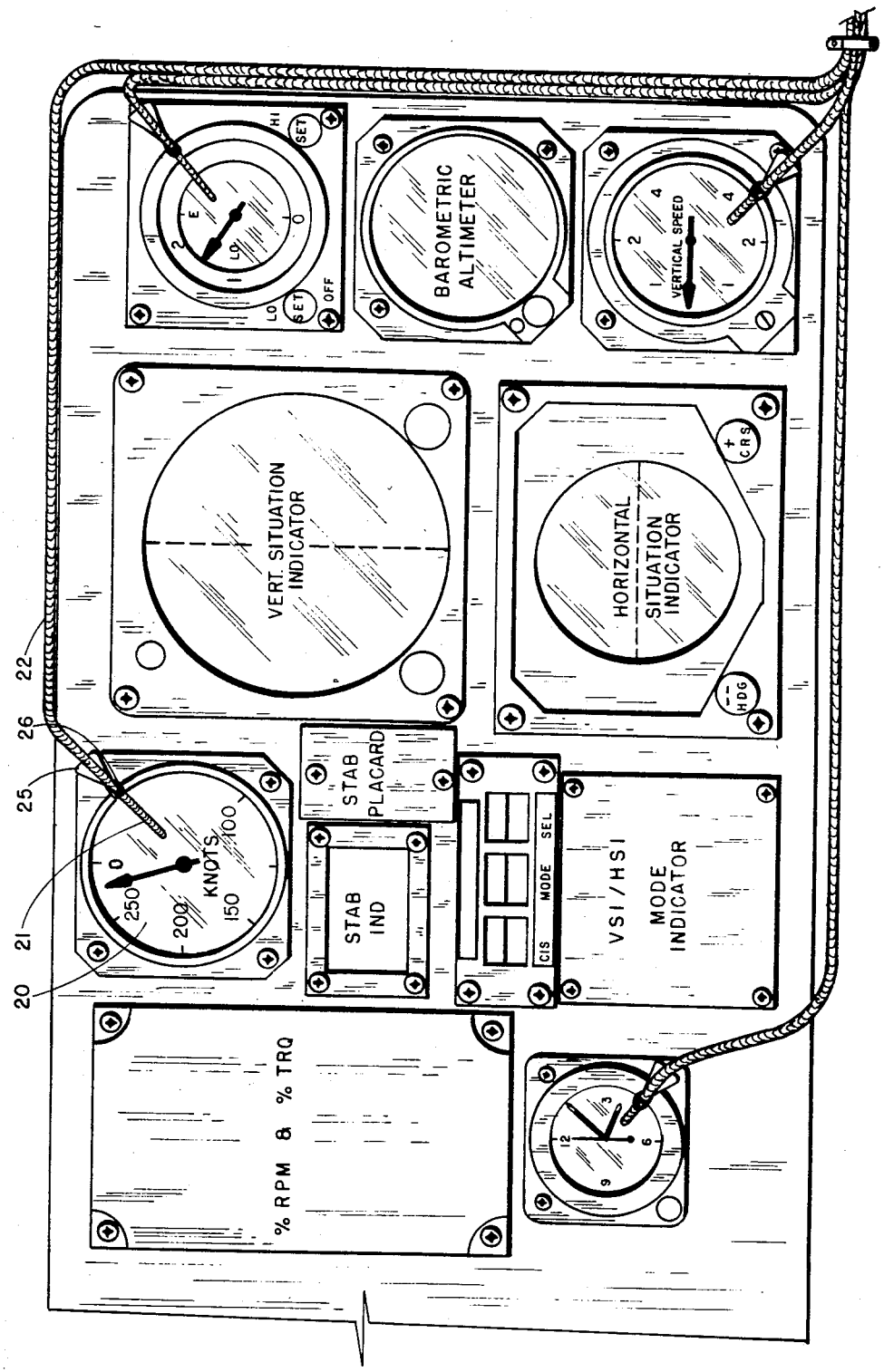
FIG. 2 is a view of the fiber optic image guides as installed on the instrument panel of an operational aircraft.

Prior to considering the invention specifically, the entire assembly is being shown in FIG. 1. The miniature lens, 21, is mounted in the end of image guide, 22, which, through coupling 30 is connected to a video camera, 23. The image is then conveyed by cable 32 to a video recorder, or monitor 24 in the usual manner.

As indicated hereinbefore a preferred embodiment of this invention involves its use for providing instrument readings at a point outside an aircraft or at a remote location within a plane during a flight test. Toward this end image guides, 22, with their lens, 21, are attached by brackets 25 to a cockpit instrument panel as shown in FIG. 2. A close-up view of the installation is shown in FIGS. 3 and 4. On attaching bracket, 25, to the instrument face the instrument screw, 26, is removed, the bracket, 25, is added, and the screw 26 is replaced with the bracket between the screw head and the face of the instrument.

FIG. 3 is a top view of an instrument with a fiber optic image guide, 22, and bracket, 25, so attached. The bracket is located to minimize obstruction of the pilot's or co-pilot's view of the instrument. Most cockpits have a dual set of instruments, and the image guides can then be used on only one set of instruments. FIG. 4 is a side view of the installation shown in FIG. 3.

Turning now to the operation of the viewing assembly of the invention we again refer to FIG. 1. Miniature lens 21 views the image on the instrument face, and transmits this image, through image guide 22, to a video camera 23. The image is received and transmitted in the conventional electronic manner to a video recorder or monitor 24, as seen in FIG. 1. Image guide 22 forms a coherent fiber optic bundle for transmitting the images to coupling 30. Coupling 30 is a standard C-mount adapter which couples a TV or 16 mm camera lens to a relay lens in the fiber bundle end. Camera 23 can be a conventional video camera, or vidicon, and this camera is connected in the known manner with a standard video recorder 24, a VCR, or similar viewing apparatus. Power for the system is supplied to the camera, either from a conventional aircraft source, or from a battery pack, if a satisfactory aircraft source is not available.

It can be seen that an advantage of this invention is that in addition to solving the instrument separation and vibration problems the viewing assembly of the invention does not obstruct the pilot's view of the instrument. Having been given the teachings of this invention other embodiments will occur to those skilled in the art. Thus, in lieu of a video recorder a monitor can be used. The system is then ideally suited for viewing instruments in hospitals and nursing homes. It will be clear also that objective lens 21 can be fixed focus lens set at their distances above the instrument faces, or the focusing lens can be used so that the viewing assembly can be moved from room to room. In this instance, suction cups or clamping means can be employed to hold the lens. In addition, means for producing permanent records of instrument readings can be provided. Such ramifications are deemed to be within the scope of this invention.

What is claimed is:

1. An instrument viewing assembly for use where a plurality of instruments must be remotely monitored, but wherein the instruments are so positioned that they cannot be viewed by a single camera, comprising an objective lens for use with each instrument, means mounting the lens above each instrument face so the lens is focused thereon, a coherent fiber optic light guide, coupled to each lens and merged to form an integral fiber optic bundle for transmitting images to a remote location, a viewing camera for continuous monitoring at the remote location, and a camera adapter which couples the fiber optic bundle to the viewing camera.

2. The viewing assembly of claim 1 wherein the objective lens is a focusable lens adapted to be focused on the instrument face after being mounted thereabove.

3. The viewing assembly of claim 1 wherein the objective lens is a fixed focus lens and wherein the mounting means holds it at a distance above the instrument face such that the face is in focus.

4. The viewing assembly of claim 1 wherein a monitor is connected to the viewing camera.

5. The viewing assembly of claim 1 wherein a video recorder is connected to the viewing camera.

* * * * *